3,172,895
3-AMINOETHER-5(10)-ESTRENES
Fred Kagan and Norman A. Nelson, Kalamazoo, Mich.,
  assignors to The Upjohn Company, Kalamazoo, Mich.,
  a corporation of Delaware
No Drawing. Filed May 1, 1963, Ser. No. 277,131
5 Claims. (Cl. 260—397.4)

This invention relates to novel 3-aminoether-5(10)-estrene steroids and is more particularly concerned with 3α- and 3β-(2-diethylaminoethoxy)-5(10)-estren-17-one, its hydrohalides and the process of production thereof.

The novel compounds and the process of production thereof can be illustratively represented by the following sequence of formulae:

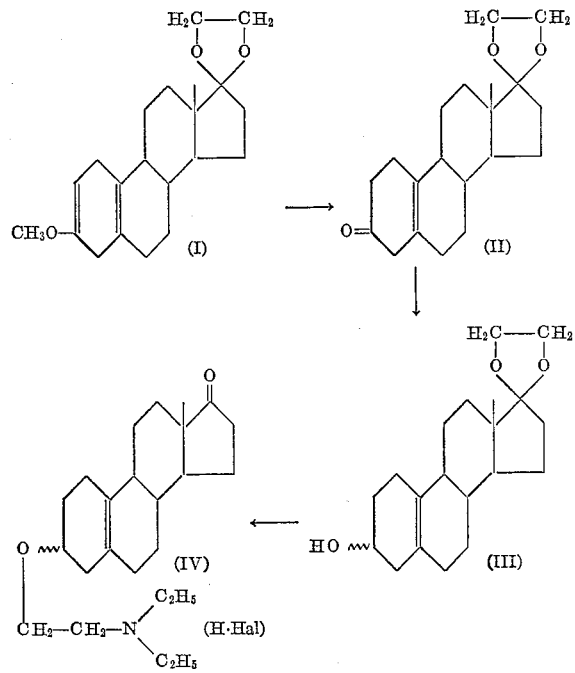

wherein Hal stands for a halogen atom selected from chlorine, bromine and iodine and wherein the wavy line ~ indicates both α- and β-linkages.

The novel products of Formula IV have significant hypocholesteremic activity and are thus useful in the treatment of atherosclerosis. Atherosclerosis is a form of arteriosclerosis which is characterized by fatty degeneration occurring in the arterial walls, by mechanisms not yet definitely established. Hypercholesteremia refers essentially to an excess of cholesterol in the blood serum. It has long been recognized that certain substances such as sitosterol, corn oil, nicotinic acid are capable of reducing in small degree the blood and tissue cholesterol contents, either by interfering with the absorption of exogenous cholesterol introduced with food, or by facilitating the excretion of cholesterol. Major emphasis, however, has been placed on the search for compounds which will interfere with the production of endogenous cholesterol by the liver and hence offer a more positive means of control of cholesterol levels.

The novel compounds of Formula IV of the present invention significantly reduce the cholesterol content of both blood and tissue by partially arresting the biosynthesis of cholesterol in the body.

The compounds also act as central nervous system stimulants and can thus be used in symptomatic treatment of birds and mammals.

The compounds furthermore have activity against the eggs and larvae of common animal parasites and can be used in sprays or powders for cattle and poultry or can be incorporated into animal bedding, to prevent parasitic diseases.

The novel free bases of Formula IV are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The products of this invention are obtained as described in the examples.

EXAMPLE 1

3α- and 3β-hydroxy-5(10)-estren-17-one,17-cyclic ethylene acetal

To a solution of 10.0 g. of 3-methoxy-2,5(10)estradien-17-one, cyclic ethylene acetal (I) [P. De Ruggieri, Gazz. chim. ital., 87 795 (1957)], in 125 ml. of tetrahydrofuran, was added 16 ml. of 5% sulfuric acid and the mixture was stirred at room temperature for a period of 3.5 hours before being shaken with ether and dilute sodium bicarbonate solution. The hydrolysis above can also be performed with aqueous hydrochloric, hydrobromic, hydroiodic and perchloric acid and other aqueous mineral acids.

The ether layer was washed with water, dried and concentrated in vacuo to give crude 5(10)-estrene-3,17-dione, cyclic ethylene acetal (II).

This material in 75 ml. of anhydrous ether was added dropwise with stirring to a mixture of 3 g. of lithium aluminum hydride in 600 ml. of ether. The mixture was stirred at room temperature (about 23–25° C.) for 2 hours when a solution of 20 ml. of ethyl acetate and 25 ml. of ether was added slowly followed by the cautious addition of 3 ml. of water, and 9 ml. of 30% sodium hydroxide solution. The mixture was filtered and the residue obtained by concentrating the filtrate was chromatographed on Florisil using gradient elution with from 5 to 30% acetone in Skellysolve B as eluent. The first material eluted from the column (300 mg., ca. 11% acetone-Skellysolve B hexanes eluent) was 3α-hydroxy-5(10)-estren-17-one, cyclic ethylene acetal (III). The analytic sample was recrystallized from Skellysolve B hexanes, M.P. 105–107° and rotation $[\alpha]_D$ +70°, c. 0974 (CHCl$_3$).

Analysis.—Calcd. for $C_{20}H_{30}O_3$: C. 75.43; H, 9.50. Found: C, 74.95; H, 9.71.

The second fraction (2.54 g.) eluted from the column with 12% acetone-Skellysolve B hexanes was a mixture of isomers while the following three fractions (eluted with 13–16% acetone-Skellysolve B hexanes) yielded 3.30 g. of 3β-hydroxy-5(10)-estren-17-one cyclic ethylene acetal (III). The analytical sample recrystallized from acetone-Skellysolve B, M.P. 133–134°, $[\alpha]_D$ +113°, c. 0.87 (CHCl$_3$).

Analysis.—Calcd. for $C_{20}H_{30}O_3$: C, 75.43; H, 9.50. Found: C, 75.03; H, 9.56.

EXAMPLE 2

3β-(22-diethylaminoethoxy)-5(10)-estren-17-one hydrochloride

A solution was prepared containing 3.3 g. of 3β-hydroxy-5(10)-estren-17-one, 17-cyclic ethylene acetal in 25 ml. of benzene. This solution was cooled in a nitrogen atmosphere and thereto was added 4 ml. of 2.68 N n-butyllithium in heptane, followed after an interval of 10 minutes by 2 g. of β-diethylaminoethyl chloride in 2 ml. of toluene. The mixture was thereupon refluxed and stirred for a period of 24 hours, then diluted with 15 ml. of water, stirred again for 30 minutes and then diluted with 50 ml. of ether. This reaction mixture was extracted with 3 portions of 25 ml. each of dilute hydrochloric acid, the thus obtained hydrochloric acid extracts were combined, washed with ether and allowed to stand at room temperature for 1 hour before being extracted with 3 portions of methylene chloride, each of which was 50 ml. The methylene chloride extracts were dried over anhydrous sodium sulfate, concentrated to about 10 ml. and diluted with ether which percipitated a white material. The material was recovered by filtration and was recrystallized from tetrahydrofuran to give 3β-(2-diethylaminoethoxy-5(10)-estren-17-one hydrochloride of melting point 158–159° C. and having an analysis as follows:

*Analysis.*—Calcd. for $C_{24}H_{40}ClNO_2$: C, 70.30; H, 9.83; Cl, 8.65. Found: C, 70.08; H, 10.21; Cl, 8.64.

Instead of butyllithium, other alkali metal metathetically reactive reagents, e.g., triphenylmethyl sodium, triphenylmethyl potassium, metal hydrides such as sodium or potassium hydride, propyl lithium, butyl sodium can be used in the above reaction.

EXAMPLE 3

*3α-(2-diethylaminoethoxy)-5(10)-estren-17-one hydrochloride*

To a solution of 2 g. of 3α-hydroxy-5(10)-estren-17-one, 17-ethylene acetal in 25 ml. of tetrahydrofuran was added a 5% molar excess of ethereal triphenylmethyl sodium. The solution was allowed to stand for 10 minutes and thereupon was added 1.1 g. of diethylaminoethyl chloride dissolved in 1.1 ml. of toluene. The reaction mixture was stirred at about 25° for 1 hour and heated under reflux temperature for 2 hours. A second portion of 1.1 g. of diethylaminoethyl chloride dissolved in 1.1 ml. of toluene was added and this mixture heated at reflux temperature for another 3 hours. The reaction mixture was concentrated in a vacuum and the thus-obtained residue redissolved in a mixture of benzene and water. The organic layer was washed three times with water, dried over anhydrous sodium sulfate and concentrated under vacuum. The residue was dissolved in ether and the ether solution was then saturated with gaseous hydrogen chloride. The precipitate which formed was collected and was three times recrystallized from ether and methanol to give pure 3α-(2-diethylaminoethoxy)-5(10)-estren-17-one hydrochloride.

The hydroiodide and hydrobromide salts of 3α- or 3β-(2-diethylaminoethoxy)-5(10)-estren-17-one can be obtained by substituting hydrogen chloride with hydrogen bromide or ethereal hydrogen iodide. Purification of these salts can be carried out by dissolving it in methylene chloride and reprecipitating it by the addition of ether.

EXAMPLE 4

*3β-(2-diethylaminoethoxy)-5(10)-estren-17-one*

One gram of 3β-(2-diethylaminoethoxy)-5(10)-estren-17-one hydrochloride in 30 ml. of water was treated with aqueous 5% sodium hydroxide solution until the reaction mixture was basic. The mixture was thereupon three times extracted with methylene chloride, the methylene chloride extracts were combined, dried over anhydrous sodium sulfate and evaporated. The resulting residue was three times recrystallized from Skellysolve B hexanes and ether to give crystalline 3β-(2-diethylaminoethoxy)-5(10)-estren-17-one.

In the same manner as in Example 4, 3α-(2-diethylaminoethoxy)-5(10)-estren-17-one is prepared from its hydrochloride salt by reacting this salt with sodium hydroxide.

3β-(2-diethylaminoethoxy)-5(10)-estren-17-one hydrochloride lowered the blood cholesterol level in the rat by 44%.

We claim:
1. A 3-aminoether-5(10)-estrene steroid of the formula

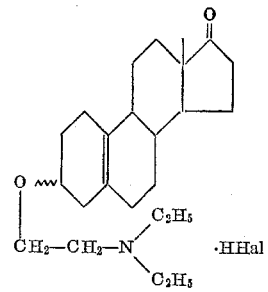

wherein Hal stands for a halogen atom selected from the group consisting of chlorine, bromine and iodine.

2. 3β-(2-diethylaminoethoxy)-5(10)-estren-17-one hydrochloride.

3. 3α-(2-diethylaminoethoxy)-5(10)-estren-17-one hydrochloride.

4. A 3-aminoether-5(10)-estrene steroid of the formula

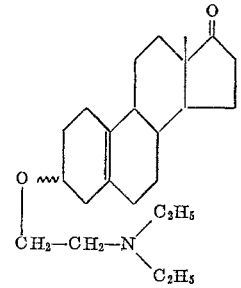

5. A process for the production of 3-aminoether-5(10)-estrene of the formula:

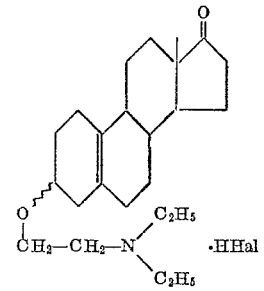

wherein Hal stands for a halogen atom selected from the group consisting of chlorine, bromine and iodine, which comprises: hydrolizing with aqueous mineral acid 3-methoxy-2,5(10)-estradien-17-one cyclic ethylene acetal to yield 5(10)-estrene-3,17-dione cyclic ethylene acetal, reducing the acetal with lithium aluminum hydride, separating 3α-hydroxy-5(10)-estren-17-one cyclic ethylene acetal and 3β-hydroxy-5(10)-estren-17-one cyclic ethylene acetal and reacting the thus obtained products separately with an alkali metal metathetically active reagent followed by diethylaminoethyl chloride to give the corresponding compounds of the above formula.

No references cited.

LEWIS GOTTS, *Primary Examiner.*